US011516651B2

(12) United States Patent
Nakahara

(10) Patent No.: US 11,516,651 B2
(45) Date of Patent: Nov. 29, 2022

(54) WIRELESS COMMUNICATION DEVICE THAT CHANGES SETTING CONTENT OF BEACON TERMINAL

(71) Applicant: FUJITSU COMPONENT LIMITED, Tokyo (JP)

(72) Inventor: Mamoru Nakahara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/620,202

(22) Filed: Jun. 12, 2017

(65) Prior Publication Data

US 2018/0014181 A1 Jan. 11, 2018

(30) Foreign Application Priority Data

Jul. 6, 2016 (JP) .............................. JP2016-134520

(51) Int. Cl.
*H04M 3/00* (2006.01)
*H04Q 5/22* (2006.01)
*H04W 24/00* (2009.01)
*G06F 15/16* (2006.01)
*H04W 8/22* (2009.01)

(52) U.S. Cl.
CPC ..................... *H04W 8/22* (2013.01)

(58) Field of Classification Search
CPC ...................................... H04W 8/22
USPC ........................................ 455/419
See application file for complete search history.

(56) References Cited

U.S. PATENT DOCUMENTS

2001/0032121 A1\* 10/2001 Le .......................... G06Q 30/02
 705/14.45
2001/0054066 A1\* 12/2001 Spitzer .................... H04L 29/06
 709/203
2002/0116209 A1 8/2002 Tsuge
 (Continued)

FOREIGN PATENT DOCUMENTS

JP 2000-305994 11/2000
JP 2002-190065 7/2002

OTHER PUBLICATIONS

Japanese Platform for Patent Information, Publication No. 2000-305994, published Nov. 2, 2000.
(Continued)

*Primary Examiner* — Mark G. Pannell
(74) *Attorney, Agent, or Firm* — Staas & Halsey LLP

(57) ABSTRACT

A wireless communication device including: a memory that stores a setting content of a beacon terminal to be rewritten, identification information of the beacon terminal, and a flag indicating whether the setting of the beacon terminal has been already rewritten, the setting content, the identification information and the flag being associated with each other; and a processor coupled to the memory and the processor configured to: acquire data broadcasted from the beacon terminal; and transmit the setting content to the beacon terminal, and cause the beacon terminal to change the setting when identification information of the beacon terminal included in the data acquired from the beacon terminal is identical with the identification information stored into the memory, changing the setting of the beacon terminal is not completed and a strength of a received signal from the beacon terminal is equal to or more than a threshold value.

9 Claims, 7 Drawing Sheets

(56) References Cited

U.S. PATENT DOCUMENTS

| | | | | |
|---|---|---|---|---|
| 2003/0132298 | A1* | 7/2003 | Swartz | G06K 17/00 |
| | | | | 235/472.02 |
| 2005/0060649 | A1* | 3/2005 | Kimura | G06F 3/1286 |
| | | | | 715/274 |
| 2009/0177736 | A1* | 7/2009 | Christensen | G06Q 30/02 |
| | | | | 709/203 |
| 2011/0075611 | A1* | 3/2011 | Choi | H04L 1/1819 |
| | | | | 370/329 |
| 2013/0304790 | A1* | 11/2013 | Kimura | H04L 67/1095 |
| | | | | 709/201 |
| 2015/0095124 | A1* | 4/2015 | Felt | G06Q 30/0259 |
| | | | | 705/14.5 |
| 2015/0271676 | A1* | 9/2015 | Shin | H04W 12/08 |
| | | | | 713/168 |
| 2015/0350189 | A1* | 12/2015 | Shin | H04W 12/06 |
| | | | | 726/29 |
| 2016/0219475 | A1* | 7/2016 | Kim | H04W 76/025 |
| 2016/0316320 | A1* | 10/2016 | Chin | H04W 4/029 |
| 2017/0142323 | A1* | 5/2017 | Saito | H04N 5/23206 |
| 2017/0171382 | A1* | 6/2017 | Ishii | H04M 3/229 |

OTHER PUBLICATIONS

Japanese Platform for Patent Information, Publication No. 2002-190065, published Jul. 5, 2002.

* cited by examiner

FIG. 3A

| SETTING ITEM | SETTING VALUE |
|---|---|
| DEVICE NAME | Beacon |
| ADVERTISING DATA | 120946434c20576972656c657373204d6f64756c652031 |
| TRANSMISSION OUTPUT | 4 |
| REMOTE SETTING FUNCTION | 1 |
| ⋮ | ⋮ |

FIG. 3B

| ADDRESS OF BEACON TERMINAL 3 | NAME OF BEACON TERMINAL 3 | ID OF BEACON TERMINAL 3 | GROUP ID |
|---|---|---|---|

FIG. 5A

| No. | ADDRESS OF BEACON TERMINAL | REWRITE COMPLETION FLAG |
|---|---|---|
| 1 | 00e000123456 | 0 |
| 2 | 00e000123457 | 0 |
| 3 | 00e000123458 | 0 |
| ⋮ | ⋮ | ⋮ |

FIG. 5B

| No. | ADDRESS OF BEACON TERMINAL | REWRITE COMPLETION FLAG |
|---|---|---|
| 1 | 00e000123456 | 1 |
| 2 | 00e000123457 | 0 |
| 3 | 00e000123458 | 0 |
| ⋮ | ⋮ | ⋮ |

WIRELESS COMMUNICATION DEVICE THAT CHANGES SETTING CONTENT OF BEACON TERMINAL

CROSS-REFERENCE TO RELATED APPLICATION

This application is based upon and claims the benefit of priority of the prior Japanese Patent Application No. 2016-134520 filed on Jul. 6, 2016, the entire contents of which are incorporated herein by reference.

FIELD

A certain aspect of the embodiments is related to a wireless communication device.

BACKGROUND

Conventionally, there has been known a system that receives, transmits and rewrite data with the use of a wireless communication (see Japanese Laid-open Patent Publication No. 2000-305994, and Japanese Laid-open Patent Publication No. 2002-190065).

Moreover, there is known a service to utilize a beacon terminal at a station, an airport or a shopping center. For example, a smartphone or a personal computer which the user carries receives data transmitted from the beacon terminal, and acquires information on a guidance or various campaign advertisements of the station or the airport.

The beacon terminal periodically broadcasts data set beforehand, and is not usually connected to the smartphone. That is, the data is not transmitted and received between the beacon terminal and the smartphone.

By the way, it may be necessary to change the setting of the beacon terminal depending on the change of the kind of the service and the configuration of the system which are provided to the user. For example, it is considered to change a device name, a transmission output or a transmission interval of the beacon terminal in accordance with the layout change of the yard of a station or the airport or the change of a providing service thereof.

On the contrary, there is also known a method of changing data to be provided to the user without changing distribution information of the beacon terminal. In the method, the smartphone which has received the distribution information from the beacon terminal transmits the distribution information to a server via a network, and acquires data to be actually used from the server, for example. However, in the method, network access is a premise, and when the terminal which the user carries cannot perform the network access, this method is ineffective.

SUMMARY

According to an aspect of the present invention, there is provided a wireless communication device including: a memory that stores a setting content of a beacon terminal to be rewritten, identification information of the beacon terminal, and a flag indicating whether the setting of the beacon terminal has been already rewritten, the setting content, identification information and the flag being associated with each other; and a processor coupled to the memory and the processor configured to: acquire data broadcasted from the beacon terminal; and transmit the setting content to the beacon terminal which has broadcasted the data, and cause the beacon terminal to change the setting when identification information of the beacon terminal included in the data acquired from the beacon terminal is identical with the identification information of the beacon terminal stored into the memory, changing the setting of the beacon terminal which has broadcasted the data is not completed and a strength of a received signal from the beacon terminal which has broadcasted the data is equal to or more than a threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating setting content of the beacon terminal;

FIG. 3B is a diagram illustrating an example of information on the beacon terminal;

FIGS. 5A and 5B are diagrams illustrating data indicating a corresponding relationship between an address of the beacon terminal and a rewrite completion flag;

DESCRIPTION OF EMBODIMENTS

When a PC (Personal Computer) connects to the beacon terminal by wireline and changes the setting of the beacon terminal, the setting of the beacon terminal can be changed simply and reliably. However, when the beacon terminal is installed at a position where a hand cannot easily reach, wire connecting work is inconvenient. Since the beacon terminal requires a connector for connecting the PC, high waterproofness and high dustproofness are required to a connector part.

It is considered to connect the PC to the beacon terminal by wireless and change the setting of the beacon terminal. However, since a large number of beacon terminals are installed at the station or the airport, when the settings of the beacon terminals are changed one-by-one by hand, an enormous amount of time is necessary for the change of the settings. Also, when the settings are changed for each set of the large number of beacon terminals, a complicated work to select the beacon terminals connected to the PC occurs, and therefore the management of the beacon terminal is not easy.

A description will now be given of an embodiment according to the present invention with reference to drawings.

Figure 1:
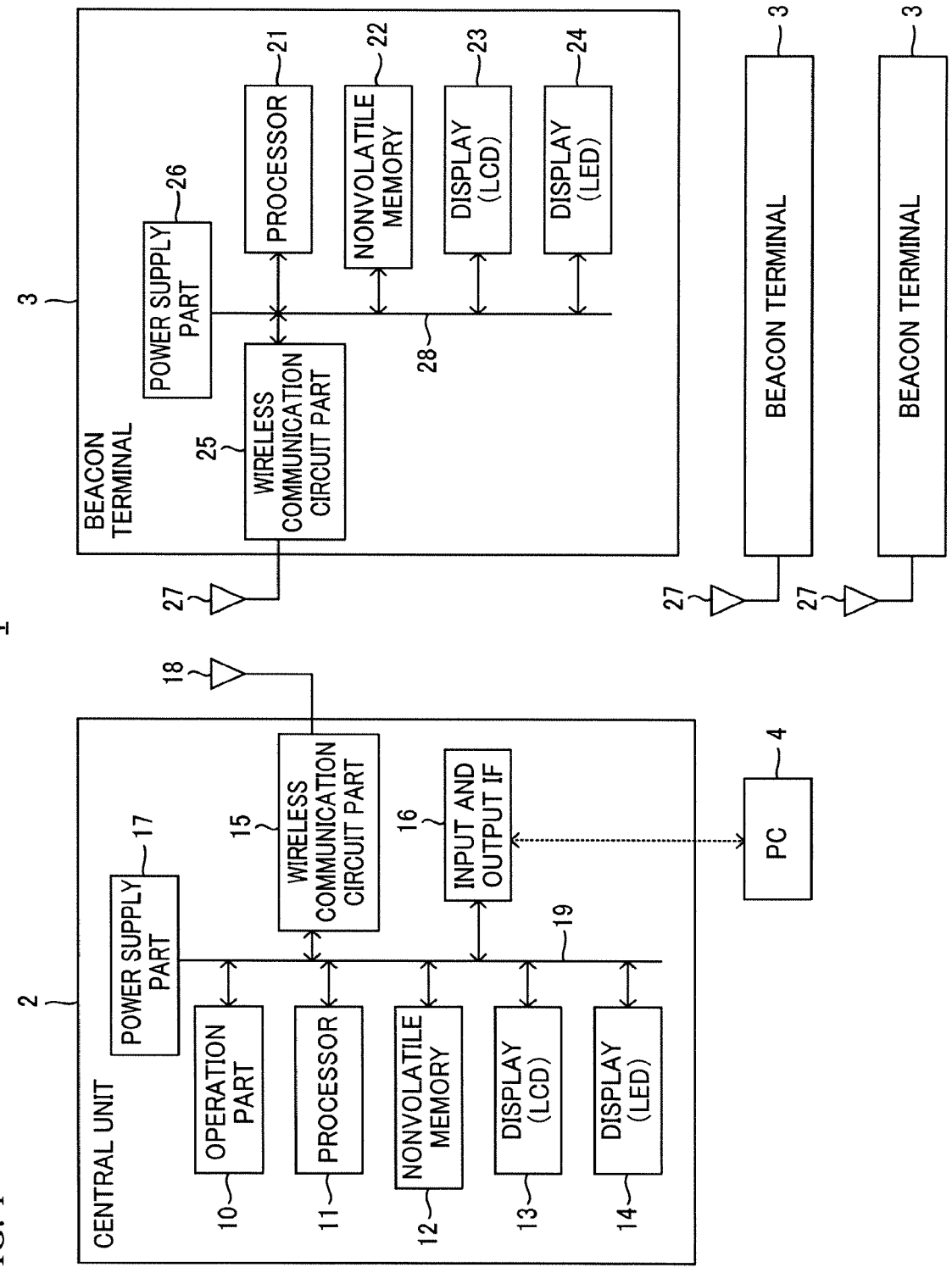
FIG. 1 is a diagram illustrating the configuration of a wireless communication system including a wireless communicator according to a present embodiment.

FIG. 1 is a diagram illustrating the configuration of a wireless communication system including a wireless communicator according to a present embodiment. Here, in the present embodiment, a description will be give of an example in which a movable wireless communicator is used as an example of the wireless communicator.

A wireless communication system 1 of FIG. 1 includes a central unit 2, a plurality of beacon terminals 3, and a computer (PC) 4. The central unit 2 is the movable wireless communicator such as a notebook computer or a smartphone which is carried by a user, for example. The central unit 2 receives data transmitted from the beacon terminal 3 and displays the data. The beacon terminal 3 broadcasts various data. The data transmitted from the beacon terminal 3 is information on a guidance or various campaign advertisements, or an ID (identifier) for accessing the information on the guidance or the various campaign advertisements stored into a server, not shown, for example.

The central unit 2 includes: an operation part 10 such as a keyboard or push buttons; a processor 11 that controls the whole operation of the central unit 2; a nonvolatile memory 12 that stores various data, various programs, setting data of the beacon terminal 3 which is a rewrite object, and a rewrite result of the setting of the beacon terminal 3; a display (LCD: Liquid Crystal Display) 13 that displays the information transmitted from the beacon terminal 3, and a rewrite completion notification and the rewrite result of the setting of the beacon terminal 3; a display (LED: Light-Emitting Diode) 14 that displays the rewrite completion notification and the rewrite result of the setting of the beacon terminal 3; a wireless communication circuit part 15 that performs wireless communication with the beacon terminal 3 in accordance with a Bluetooth Low Energy standard, and detects a strength of a reception radio wave from the beacon terminal 3; an input and output interface 16 connected to the PC 4 by wireline; a power supply part 17 that supplies an electrical power to each component of the central unit 2; and an antenna 18. The processor 11 is connected to the nonvolatile memory 12, the displays 13 and 14, the wireless communication circuit part 15, the input and output interface 16 and the power supply part 17 via a bus 19.

The processor 11 functions as an acquirer, a rewriter, a first switch and a second switch. The nonvolatile memory 12 functions as a storage. The display 13 functions as a display device. The displays 13 and 14 function as a notifier. The input and output interface 16 functions as a connector.

The display 14 is used to notify the user of the rewrite completion and the rewrite result of the setting of the beacon terminal 3. However, the central unit 2 does not need to necessarily include the display 14.

The input and output interface 16 is an interface such as a UART (Universal Asynchronous Receiver Transmitter) or a USB (Universal Serial Bus). The setting of the beacon terminal 3 which is the rewrite object is written in the central unit 2 via the input and output interface 16 by the PC 4, or the rewrite result of the setting of the beacon terminal 3 is output to the PC 4 via the input and output interface 16 and is displayed on the PC 4. The power supply part 17 is a battery or an AC power supply, for example.

The beacon terminal 3 includes: a processor 21 that controls the whole operation of the beacon terminal 3; a nonvolatile memory 22 that stores various data and programs; a display (LCD) 23 and a display (LED) 24 each of which displays a connection status with the central unit 2 and the rewrite completion of the setting of the beacon terminal 3; a wireless communication circuit part 25 that performs the wireless communication with the central unit 2 in accordance with the Bluetooth Low Energy standard; a power supply part 26 that supplies an electrical power to each component of the beacon terminal 3; and an antenna 27. The processor 21 is connected to the nonvolatile memory 22, the displays 23 and 24, the wireless communication circuit part 25 and the power supply part 26 via a bus 28.

The beacon terminal 3 does not need to include the displays 23 and 24. The power supply part 26 is a battery or an AC power supply, for example. The nonvolatile memory 22 stores an address and an ID of the central unit 2 connectable to the beacon terminal 3. The processor 21 may acquire the address or the ID of the central unit 2 from the central unit 2 at the time of connection establishment with the central unit 2, and determine whether the central unit 2 is a connectable central unit. When the acquired address or the acquired ID is not an address or an ID of the connectable central unit, the processor 21 may refuse the connection with the central unit 2.

Figure 2:
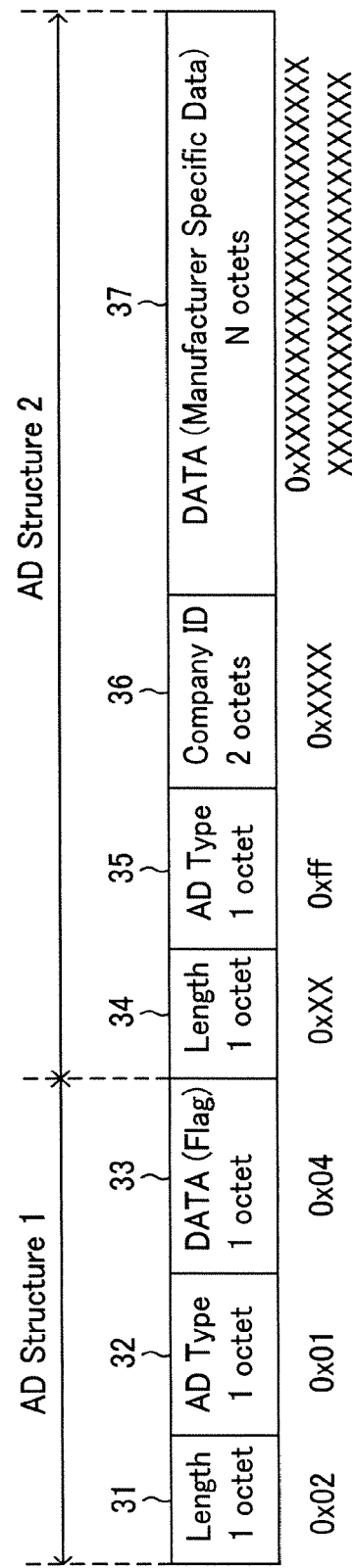
FIG. 2 is a diagram illustrating a format of advertising data which a beacon terminal broadcasts.

FIG. 2 is a diagram illustrating a format of advertising data which the beacon terminal 3 broadcasts.

The advertising data is set beforehand in accordance with the Bluetooth Low Energy standard, and therefore the details of the advertising data are omitted. In the present embodiment, the advertising data includes at least two sets of data. Data of a first set includes a data length (Length) 31, an advertising data type (AD Type) 32 and an advertising data 33 (Flag). In the example of FIG. 2, values of "0x02", "0x01" and "0x04" are input to them, respectively. The advertising data 33 (Flag) is a flag indicating not being connected to a Bluetooth terminal other than the Bluetooth Low Energy standard.

Data of a second set includes a data length (Length) 34, an advertising data type (AD Type) 35, a Company ID 36 and a user-defined data (Manufacturer Specific Data) 37. In the example of FIG. 2, values of "0xXX", "0xff", "0xXXXX" and "0xXX . . . XXX" are input to them, respectively. The user-defined data 37 is data defined uniquely by the user. In the present embodiment, the user-defined data 37 includes the address of the beacon terminal 3, a name of the beacon terminal 3, the ID of the beacon terminal 3, an ID of a group to which the beacon terminal 3 belongs, the information on the guidance or the various campaign advertisements, and the ID for accessing information stored into the server, not shown, for example.

FIG. 3A is a diagram illustrating setting content of the beacon terminal 3. A setting item and a setting value are included in the setting content of the beacon terminal 3. The setting content of the beacon terminal 3 is stored into the nonvolatile memory 12 of the central unit 2, and is used when the central unit 2 changes the setting of the beacon terminal 3. The setting content of the beacon terminal 3 can be changed by the operation part 10 or the PC 4.

In FIG. 3A, the setting content of the beacon terminal 3 includes a device name, advertising data, a transmission output and a remote setting function as the setting item. The setting content of the beacon terminal 3 may include other setting items. The device name indicates the name of the beacon terminal 3. In FIG. 3A, "Beacon" is set as the device name. The advertising data is an example of data to be output from the beacon terminal 3, and the setting value "120946 . . . 652031" indicates a local name of the beacon terminal 3, for example. The transmission output indicates a transmission output of a radio wave of the beacon terminal 3, and the setting value "4" indicates 4 dBm. The remote setting function indicates validity or invalidity of a setting change function of the beacon terminal 3 in the wireless communication. The setting value "1" indicates that the setting change function of the beacon terminal 3 in the wireless communication is valid, and a setting value "0", not shown, indicates that the setting change function of the beacon terminal 3 in the wireless communication is invalid.

FIG. 3B illustrates an example of information on the beacon terminal 3. The information of FIG. 3B includes an address, a name and an ID of the beacon terminal 3, and an ID of a group to which the beacon terminal 3 belongs (hereinafter referred to as "a group ID"), and is stored into the nonvolatile memory 12 of the central unit 2. The information of FIG. 3B is associated with the setting content of the beacon 3 of FIG. 3A. The setting content is associated with each address of the beacon terminal 3, and therefore the setting content can be rewritten for each beacon terminal 3.

The setting content of the beacon terminal 3 may be different from each other for each beacon terminal 3, and the same setting content may be set to the plurality of beacon terminals 3 identified by the group ID.

Figure 4:
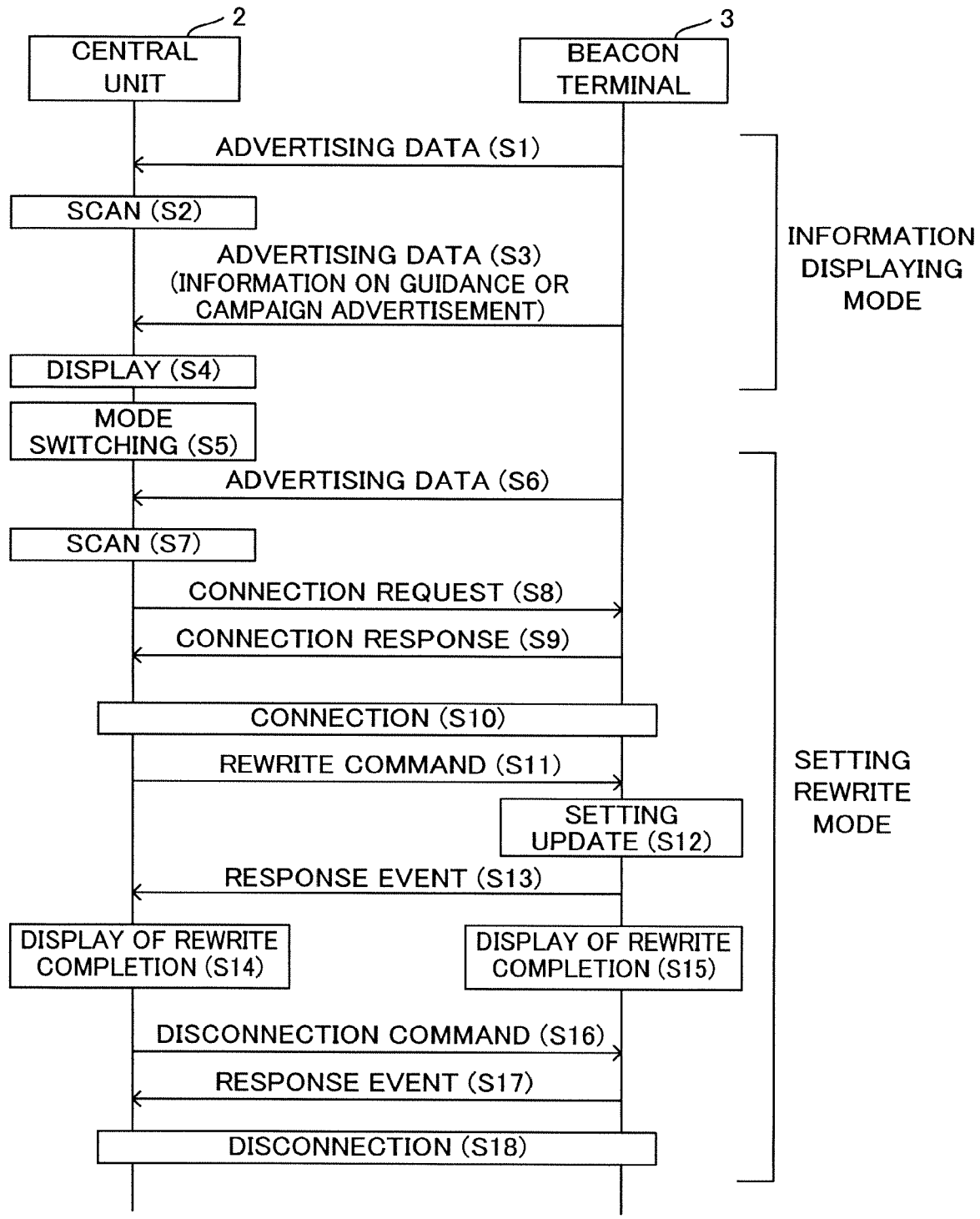
FIG. 4 is a sequence diagram illustrating processing executed by a central unit and the beacon terminal.

FIG. 4 is a sequence diagram illustrating processing executed by the central unit 2 and the beacon terminal 3. In FIG. 4, a single beacon terminal 3 is illustrated, but the same processing as the beacon terminal 3 of FIG. 4 is also performed on other beacon terminals 3.

The central unit 2 has, as a setting mode, an information displaying mode (a first mode) that receives the information on the guidance or the various campaign advertisements from the beacon terminal 3 and displays the information, and a setting rewrite mode (a second mode) that rewrites the setting of the beacon terminal 3. In an initial state, the central unit 2 is set to the information displaying mode. By the operation of the operation part 10, the setting mode of the central unit 2 is changed from the information displaying mode to the setting rewrite mode or from the setting rewrite mode to the information displaying mode.

At a normal time, the processor 21 of the beacon terminal 3 distributes the advertising data including the address of the beacon terminal 3 and the information on the guidance or the various campaign advertisements (S1). The processor 11 of the central unit 2 scans the advertising data, and receives the advertising data distributed by the beacon terminal 3 (S2 and S3).

When the advertising data is received, the information on the guidance or the various campaign advertisements included in the advertising data is displayed on the display 13 of the central unit 2 (S4).

Then, in the central unit 2, the setting mode is switched from the information displaying mode to the setting rewrite mode by the operation of the operation part 10 (S5).

In the setting rewrite mode, the beacon terminal 3 distributes the advertising data including the address of the beacon terminal 3 (S6). The central unit 2 scans the advertising data (S7). When the central unit 2 receives the advertising data, the central unit 2 transmits a connection request to the beacon terminal 3(S8). The processor 21 of the beacon terminal 3 receives the connection request from the central unit 2, and returns a connection response to the central unit 2 (S9). By this processing, wireless communication connection between the central unit 2 and the beacon terminal 3 is established (S10).

When the wireless communication with the beacon terminal 3 is established, the processor 11 of the central unit 2 returns a rewrite command including the setting content to be rewritten to the beacon terminal 3 (S11). The processor 21 of the beacon terminal 3 updates the setting of oneself according to the rewrite command received from the central unit 2 (S12), and returns a response event to the central unit 2 (S13). The processing of S11 to S13 is repeatedly performed until the rewrite of all the setting is completed.

When the rewrite of all the setting items is completed, the central unit 2 performs the display of the rewrite completion (S14). At this time, information indicating the rewrite completion is displayed on the display 13 of the central unit 2, or the display 14 turns on so as to indicate the rewrite completion. Similarly, when the rewrite of all the setting items is completed, the beacon terminal 3 performs the display of the rewrite completion (S15). At this time, information indicating the rewrite completion is displayed on the display 23 of the beacon terminal 3, or the display 24 turns on. Here, when each of the central unit 2 and the beacon terminal 3 includes a speaker, a sound or a beep sound indicating the rewrite completion may be output from the speaker.

Next, the central unit 2 returns a disconnection command to the beacon terminal 3 after a predetermined period has elapsed from the start of the display of the rewrite completion (S16). When the processor 21 of the beacon terminal 3 receives the disconnection command, the processor 21 returns a response event to the central unit 2 (S17). Thereby, the wireless communication connection between the central unit 2 and the beacon terminal 3 is disconnected (S18).

FIGS. 5A and 5B are diagrams illustrating data indicating a corresponding relationship between the address of the beacon terminal and a rewrite completion flag. FIG. 5A illustrates a state of the rewrite completion flag before the setting of the beacon terminal 3 of an address "00e000123456" is rewritten. FIG. 5B illustrates a state of the rewrite completion flag after the setting of the beacon terminal 3 of an address "00e000123456" is rewritten.

Data illustrated in FIGS. 5A and 5B is set by the operation part 10 or the PC 4, and is stored into the nonvolatile memory 12 of the central unit 2. In a state where the setting of the beacon terminal is not rewritten, a corresponding rewrite completion flag is set to "0" indicative of rewrite non-completion, as illustrated in FIG. 5A. When the rewrite of the setting of any beacon terminal 3 is completed, the processor 11 of the central unit 2 sets the rewrite completion flag corresponding to the beacon terminal 3 to "1", as illustrated in FIG. 5B.

The data of FIGS. 5A and 5B is associated with the name, the ID and the group ID of the beacon terminal 3 of FIG. 3B as well as the setting context of the beacon terminal 3 of FIG. 3A, through the address of the beacon terminal 3.

Figure 6:
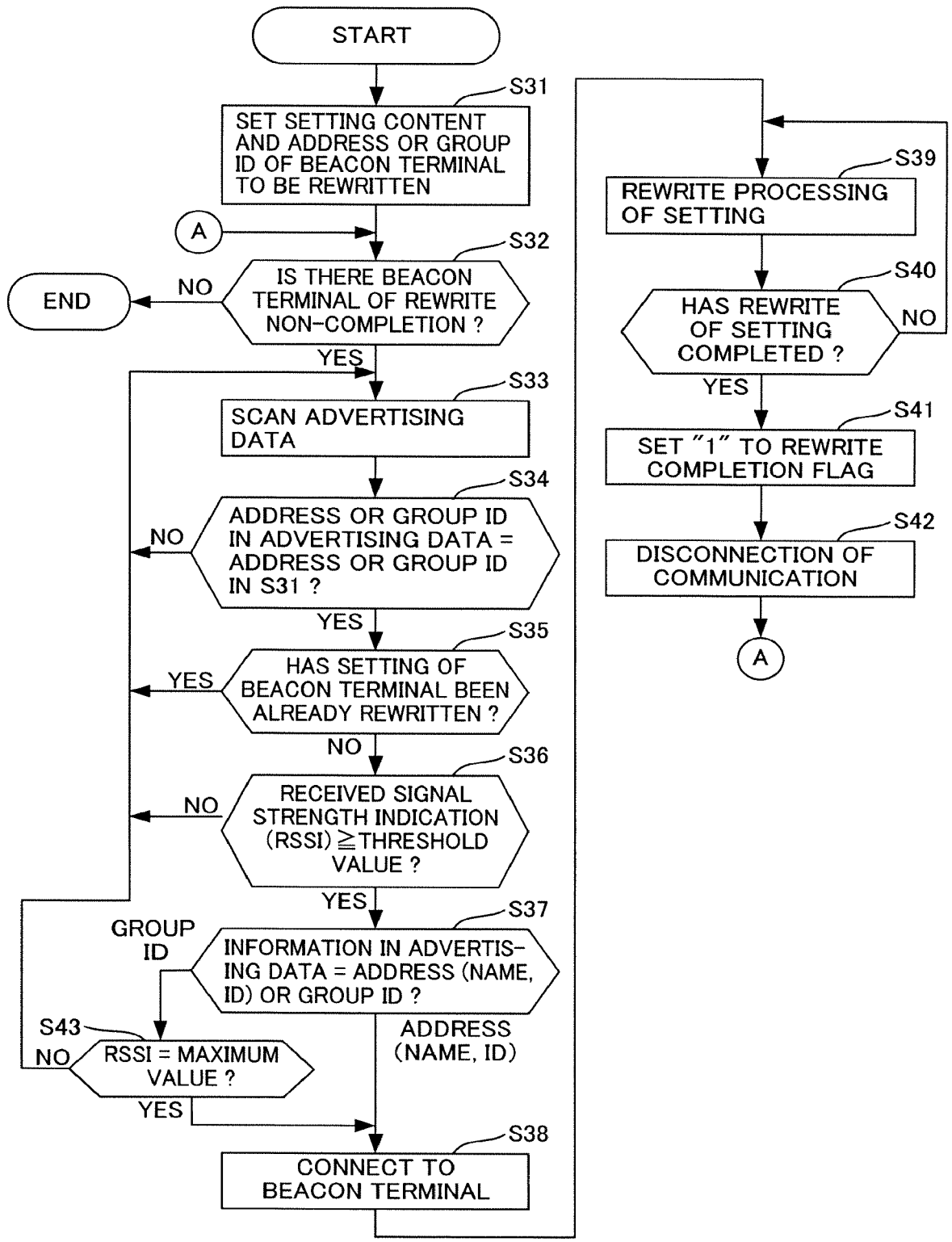
FIG. 6 is a flowchart illustrating details of processing executed by the central unit at the time of a setting rewrite mode.

FIG. 6 is a flowchart illustrating details of processing executed by the central unit 2 at the time of the setting rewrite mode.

First, the processor 11 sets the setting content and the address, the name, the ID or the group ID of the beacon terminal 3 to be rewritten to the nonvolatile memory 12 depending on the operation of the operation part 10 or the PC 4 (S31). The processor 11 determines whether there is a beacon terminal 3 of the rewrite non-completion, with reference to the rewrite completion flag of the data illustrated in FIGS. 5A and 5B (S32).

When there is no beacon terminal 3 of the rewrite non-completion (NO in S32), the processing of FIG. 6 is terminated. On the other hand, when there is the beacon terminal 3 of the rewrite non-completion (YES in S32), the processor 11 scans the advertising data from the beacon terminal 3 (S33). Here, at least one of the address, the name, the ID or the group ID of the beacon terminal 3 is included in the advertising data.

When acquiring the advertising data, the processor 11 determines whether the address, the name, the ID or the group ID included in the advertising data acquired in S33 is identical with the address, the name, the ID or the group ID set in S31 (S34). When the address, the name, the ID or the group ID included in the advertising data acquired in S33 is not identical with the address, the name, the ID or the group ID set in S31 (NO in S34), the processing returns to S33.

When the address, the name, the ID or the group ID included in the advertising data acquired in S33 is identical with the address, the name, the ID or the group ID set in S31 (YES in S34), the processor 11 determines whether the setting of the beacon terminal 3 which has broadcasted the advertising data scanned in S33 has been already rewritten, with reference to the rewrite completion flag corresponding to the acquired address of the beacon terminal 3 (S35).

When the setting of the beacon terminal 3 has been already rewritten (YES in S35), the processing returns to S33. On the other hand, when the setting of the beacon terminal 3 has not been rewritten (NO in S35), the processor 11 determines whether a received signal strength indication (RSSI) from the beacon terminal 3 is equal to or more than a threshold value (S36). This is because when the received signal strength indication is less than the threshold value, the beacon terminal 3 is far away from the central unit 2 and the setting of beacon terminal 3 cannot be rewritten stably.

When the received signal strength indication from the beacon terminal 3 is less than the threshold value (NO in S36), the processing returns to S33. On the other hand, when the received signal strength indication from the beacon terminal 3 is equal to or more than the threshold value (YES in S36), the processor 11 determines whether information included in the advertising data acquired in S33 is the address, the name or the ID that identifies the beacon terminal 3 individually, or the group ID that identifies the plurality of beacon terminals 3 (S37). Here, it is determined whether the setting of the individual beacon terminal 3 is rewritten or the plurality of beacon terminals 3 which belong to the group identified by the group ID are rewritten with the same setting content.

In S37, when the information included in the advertising data acquired in S33 is the address, the name or the ID that identifies the beacon terminal 3 individually, that is to say, the group ID is not included in the advertising data, the processor 11 connects to the beacon terminal 3 corresponding to the address, the name or the ID (S38).

After the connection with the beacon terminal 3 is completed, the processor 11 performs processing that rewrites the setting of the beacon terminal 3 (S39). Specifically, the processor 11 transmits the setting content to be rewritten to the beacon terminal 3, and causes the beacon terminal 3 to rewrite the setting content.

The processor 11 determines whether the rewrite of the setting has completed based on whether a rewrite completion notification has been received from the beacon terminal 3 (S40). When the rewrite of the setting has not completed (NO in S40), the processing returns to S39. When the rewrite of the setting has completed (YES in S40), the processor 11 sets to "1" the rewrite completion flag corresponding to the beacon terminal 3 in which the rewrite of the setting has completed (S41), and disconnects the communication with the beacon terminal 3 (S42). The present processing returns to S32.

On the other hand, when it is determined in S37 that the group ID is included in the acquired advertising data, the processor 11 connects to the plurality of beacon terminals 3 included in the same group identified by the group ID and rewrites the setting. In this case, the processor 11 sequentially searches for the beacon terminal 3 having a maximum received signal strength indication, based on the received signal strength indication of each of the beacon terminals 3 which belongs to the same group (S43). The reason for searching for the beacon terminal 3 having the maximum received signal strength indication is to look for the beacon terminal 3 whose setting is stably rewritten in order that the central unit 2 moves by the movement of the user. Moreover, the plurality of beacon terminal 3 identified by the group ID are rewritten with the same setting content, but the setting is rewritten in turn from the beacon terminal 3 having the maximum received signal strength indication at S43, i.e., the beacon terminal 3 near the central unit 2.

When the received signal strength indication from a certain beacon terminal 3 is a maximum value (YES in S43), the processor 11 connects to the beacon terminal 3 (S38). On the other hand, when the received signal strength indication from the certain beacon terminal 3 is not the maximum value (NO in S43), the processing returns to S33, and the processor 11 checks the received signal strength indication of another beacon terminal 3.

In the wireless communication system 1 of FIG. 1, the processor 11 sets the setting content of the beacon terminal 3 to be rewritten, depending on the operation of the operation part 10 or the PC 4. However, for example, the central unit 2 may receive the setting content of the beacon terminal 3 to be rewritten from another wireless communication device such as a smartphone, and set the received setting content to the nonvolatile memory 12.

Figure 7A:
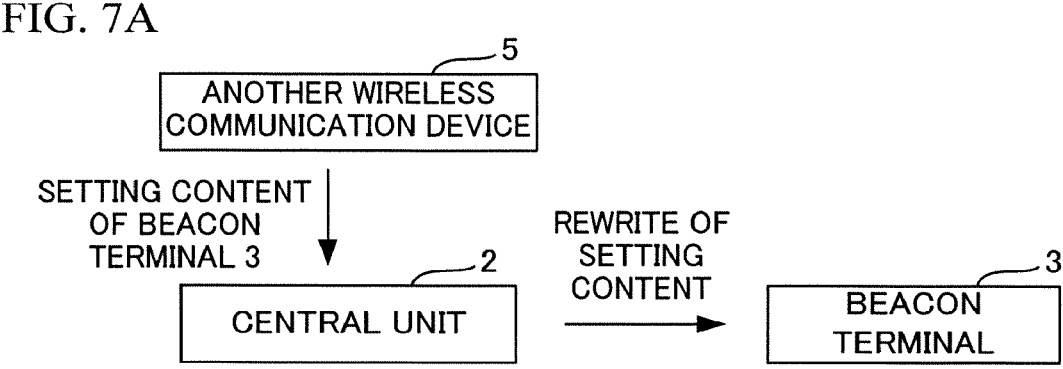
FIG. 7A is a diagram illustrating the configuration of a variation of the wireless communication system.

FIG. 7A is a diagram illustrating the configuration of a variation of the wireless communication system 1. In FIG. 7A, the central unit 2 receives the setting content of the beacon terminal 3 to be rewritten from another wireless communication device 5, and sets the setting content of the beacon terminal 3 to be rewritten to the nonvolatile memory 12. Then, the central unit 2 transmits the setting content of the beacon terminal 3 to be rewritten to the corresponding beacon terminal 3, and the corresponding beacon terminal 3 rewrites the setting content. Here, the configuration of the another wireless communication device 5 is the same as that of the central unit 2. That is, the another wireless communication device 5 includes the processor, the nonvolatile memory, the displays, the wireless communication circuit part, the input and output interface and the power supply part.

Figure 7B:
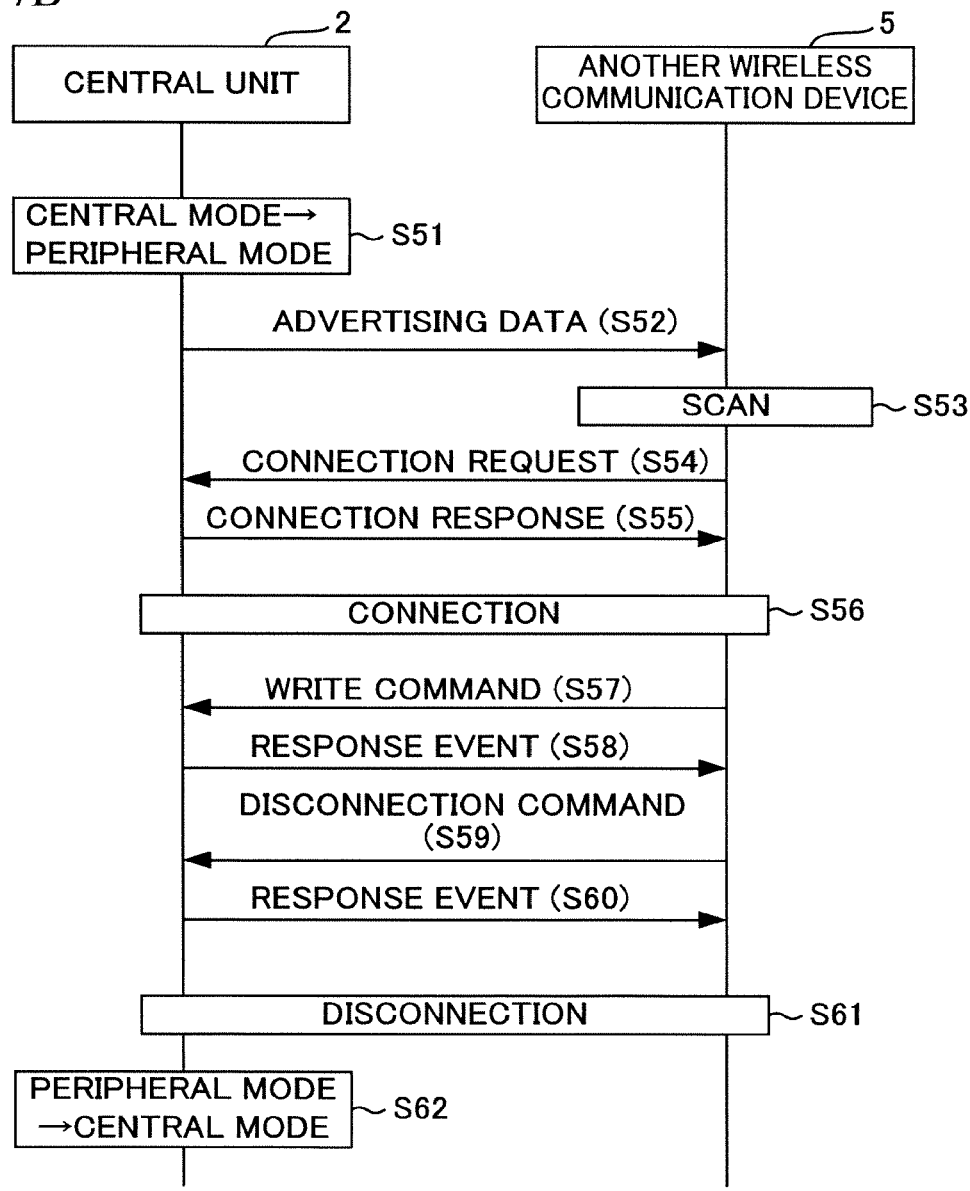
FIG. 7B is a sequence diagram illustrating a method of setting the setting content of the beacon terminal to the central unit.

FIG. 7B is a sequence diagram illustrating a method of setting the setting content of the beacon terminal 3 to the central unit 2.

The central unit 2 includes, as a setting mode, a peripheral mode (a third mode) for broadcasting the advertising data to the another wireless communication device 5 like the beacon terminal 3, and a central mode (a fourth mode) for receiving the advertising data from the beacon terminal 3. In an initial state, the setting mode of the central unit 2 is set to the central mode. The setting mode of the central unit 2 is switched from the central mode to the peripheral mode or from the peripheral mode to the central mode by the operation of the operation part 10.

First, the processor 11 of the central unit 2 switches the setting mode from the central mode to the peripheral mode depending on the operation of the operation part 10 (S51).

The processor 11 of the central unit 2 broadcasts the advertising data including the address or the like of the central unit 2 (S52). The processor of the another wireless communication device 5 scans the advertising data (S53), and transmits a connection request to the central unit 2 which has broadcast the advertising data (S54). When receiving the connection request, the processor 11 of the central unit 2 returns a connection response to the another wireless communication device 5 (S55), and the wireless communication connection between the central unit 2 and the another wireless communication device 5 is established (S56).

When the wireless communication connection is established, the processor of the another wireless communication device 5 transmits a write command including the setting content of the beacon terminal 3 to be rewritten to the central unit 2 (S57).

The processor 11 of the central unit 2 writes in the nonvolatile memory 12 the setting content of the beacon terminal 3 included in the received write command, and returns a response event to the another wireless communication device 5 (S58). After a predetermined period has elapsed, the processor of the another wireless communication device 5 returns a disconnection command to the central unit 2 (S59). When receiving the disconnection command, the processor 11 of the central unit 2 returns a response event to the another wireless communication device 5 (S60). Thereby, the wireless communication connection between the central unit 2 and the another wireless communication device 5 is disconnected (S61). Then, in the central unit 2, the setting mode is switched from the peripheral mode to the central mode by the operation of the operation part 10 (S62). Here, the rewrite of the setting to the beacon terminal 3 from the central unit 2 is performed according to FIG. 4.

In FIG. 7B, the central unit 2 acquires the setting content of the beacon terminal 3 to be rewritten from the another wireless communication device 5. Moreover, the central unit 2 may also acquire the address, the name, the ID or the group ID of the beacon terminal 3 to be rewritten, and the data indicating the corresponding relationship between the address of the beacon terminal and the rewrite completion flag from the another wireless communication device 5.

As described above, according to the present embodiment, the central unit 2 includes: the nonvolatile memory 12 that stores the setting content of the beacon terminal 3 to be rewritten, identification information of the beacon terminal 3, and a flag indicating whether the setting of the beacon terminal 3 has been already rewritten, the setting content, identification information and the flag being associated with each other; and the processor 11 that acquires the advertising data from the beacon terminal 3; wherein when identification information of the beacon terminal 3 included in the advertising data is identical with the identification information of the beacon terminal 3 stored into the nonvolatile memory 12, rewriting the setting of the beacon terminal 3 which has broadcasted the advertising data is not completed and the received signal strength indication from the beacon terminal 3 which has broadcasted the advertising data is equal to or more than the threshold value, the processor 11 rewrites the setting of the beacon terminal 3 which has broadcasted the advertising data.

Thus, the central unit 2 automatically connects to the beacon terminal 3 to be rewritten and rewrites the setting of the beacon terminal 3. Therefore, the user holding the central unit 2 only approaches the beacon terminal 3, which make it possible to rewrite the setting of the beacon terminal 3. Accordingly, the setting of a large number of beacon terminals can be changed easily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A wireless communication device that communicates with one or more beacon terminals, each beacon terminal, among the one or more beacon terminals, storing first advertising data and second identification information, the first advertising data being information on a guidance or campaign advertisements and broadcasting the first advertising data, the wireless communication device comprising:

a memory that stores,
   first identification information associated with a beacon terminal among the one or more beacon terminals,
   a pre-stored second advertising data associated with the first identification information, the second advertising data being information on a guidance or campaign advertisements to be written into the beacon terminal, and
   a flag associated with the first identification information and indicating whether the first advertising data stored in the beacon terminal corresponding to the associated first identification information has been already rewritten; and
a processor coupled to the memory and the processor configured to:
   receive the first advertising data broadcasted from the beacon terminal;
   acquire the second identification information included in the received first advertising data identifying the beacon terminal that broadcasted the first advertising data, and
   when the flag in which the associated first identification information is identical to the received second identification information indicates that the first advertising data stored in the beacon terminal has not been rewritten, and a strength of a received signal from the beacon terminal which has broadcasted the data is equal to or more than a threshold value, transmit the second advertising data to the beacon terminal corresponding to the acquired second identification information and cause the beacon terminal not to rewrite the second identification information in the beacon terminal with another identification information, to rewrite only the stored first advertising data which is the information on the guidance or campaign advertisements with the transmitted second advertising data which is the information on the guidance or campaign advertisements and to broadcast the second advertising data instead of the first advertising data,
   wherein the first identification information, the second advertising data, and the flag are stored into the memory before the processor acquires the second identification information from the beacon terminal.

2. The wireless communication device as claimed in claim 1, further comprising:
a display that displays the information received from the beacon terminal which has broadcasted the first advertising data;
wherein,
   the processor switches a setting mode of the wireless communication device to any one of a first mode for displaying the information received from the beacon terminal and a second mode for causing the beacon terminal to rewrite the stored first advertising data, the display displays the information received from the beacon terminal when the setting mode is the first mode, and the processor causes the beacon terminal to rewrite the stored first advertising data with the transmitted second advertising data when the setting mode is the second mode.

3. The wireless communication device as claimed in claim 1, wherein the memory stores individual second advertising data associated with individual first identification information identifying each individual beacon terminal and group second advertising data associated with group first identification information identifying a group in which a plurality of the beacon terminals belong, when the second identification information acquired from the beacon terminal is identification information identifying the beacon terminal individually, the processor transmits the individual second advertising data to the beacon terminal corresponds to the individual first identification identical to the received second identification information, and when the second identification information acquired from the beacon terminal is group identification information identifying a group in which a plurality of beacon terminals belong, the processor transmits the group second advertising data to each of the beacon terminals belongs to the group first identification information identical to the received second identification information.

4. The wireless communication device as claimed in claim 1, wherein when the second identification information acquired from the beacon terminal is identification information identifying a group to which a plurality of beacon terminals belong, the processor connects to each of the plurality of beacon terminals in turn from the beacon terminal having a maximum strength of the received signal, and changes the first advertising data of the plurality of beacon terminals to the second advertising data.

5. The wireless communication device as claimed in claim 1, wherein the processor switches the setting mode of the wireless communication device to any one of a third mode for communicating with another wireless communication device and a fourth mode for receiving the advertising data from the beacon terminal, when the setting mode of the wireless communication device is the third mode, the processor acquires, from the another wireless communication device, the advertising data to be rewritten and the first identification information of the beacon terminal to be rewritten.

6. The wireless communication device as claimed in claim 1, wherein when rewrite of all the second advertising data is completed, each of the wireless communication device and the beacon terminal performs a display of rewrite completion.

7. A wireless communication device that communicates with one or more beacon terminals, each beacon terminal, among the one or more beacon terminals, broadcasting first advertising data and second identification information, the first advertising data being information on a guidance or campaign advertisements, the wireless communication device comprising:

a memory that stores first identification information associated with the one or more beacon terminals to identify each of the one or more beacon terminals, second advertising data associated with the first identification information and to be rewritten, the second advertising data being information on a guidance or campaign advertisements to be written, and a flag associated with the first identification information and indicating whether the first advertising data stored in a beacon terminal, among the one or more beacon terminals, has been already rewritten into the beacon terminal associated with the first identification information; and a processor coupled to the memory and the processor configured to:

receive data broadcasted from the beacon terminal, the data containing the second identification information identifying the beacon terminal that broadcasted the data;

acquire the second identification information from the received data; and transmit, to the beacon terminal corresponding to the acquired second identification information, the second advertising data stored in the memory that corresponds to the first identification information identical with the acquired second identification information to cause the beacon terminal not to rewrite the second identification information in the beacon terminal with another identification information to rewrite only the first advertising data which is the information on the guidance or campaign advertisements with the transmitted second advertising data which is the information on the guidance or campaign advertisements to enable the beacon terminal to broadcast the second advertising data instead of the first advertising data, when the flag associated with first identification information identical with the acquired second identification information indicates that the first advertising data stored in the beacon terminal has not been rewritten, wherein the first identification information, the second advertising data, and the flag are stored into the memory before the processor acquires the second identification information from the beacon terminal.

8. The wireless communication device as claimed in claim 7, wherein the processor transmits the second advertising data to the beacon terminal when a signal strength of the received first advertising data is equal to or more than a threshold value.

9. A wireless communication device that communicates with a beacon terminal, which beacon terminal broadcasts first advertising data which is information on a guidance or campaign advertisements to be notified to other beacon terminal devices and stores second identification information, the wireless communication device comprising:

a memory that stores first identification information identifying the beacon terminal, second advertising data corresponding to the first identification information, the second advertising data being information on a guidance or campaign advertisements to be written into a beacon terminal identified by the first identification information, and a flag indicating whether the first advertising data stored in the beacon terminal corresponding to the first identification information has been already rewritten; and a processor coupled to the memory and configured to:
  receive the first advertising data broadcasted from the beacon terminal, the first advertising data containing the second identification information for identifying the beacon terminal that broadcasted the first advertising data;
  acquire the second identification information from the received first advertising data,
  transmit, to the beacon terminal corresponding to the acquired second identification information, the second advertising data stored in the memory that corresponds to the first identification information identical with the acquired second identification information to cause the beacon terminal not to rewrite the second identification information in the beacon terminal with another identification information and to rewrite only the first advertising data which is the information on the guidance or campaign advertisements with the transmitted second advertising data which is the information on the guidance or campaign advertisements, when the flag associated with first identification information identical with the acquired second identification information indicates that the first advertising data has not been rewritten, and
  set the flag so as to indicate that the first advertising data stored in the beacon terminal is rewritten with the transmitted second advertising data when the beacon terminal notified the wireless communication device of completion of the rewrite,
wherein the first identification information, the second advertising data, and the flag are stored into the memory before the processor acquires the second identification information from the beacon terminal.

* * * * *